Patented Apr. 7, 1953

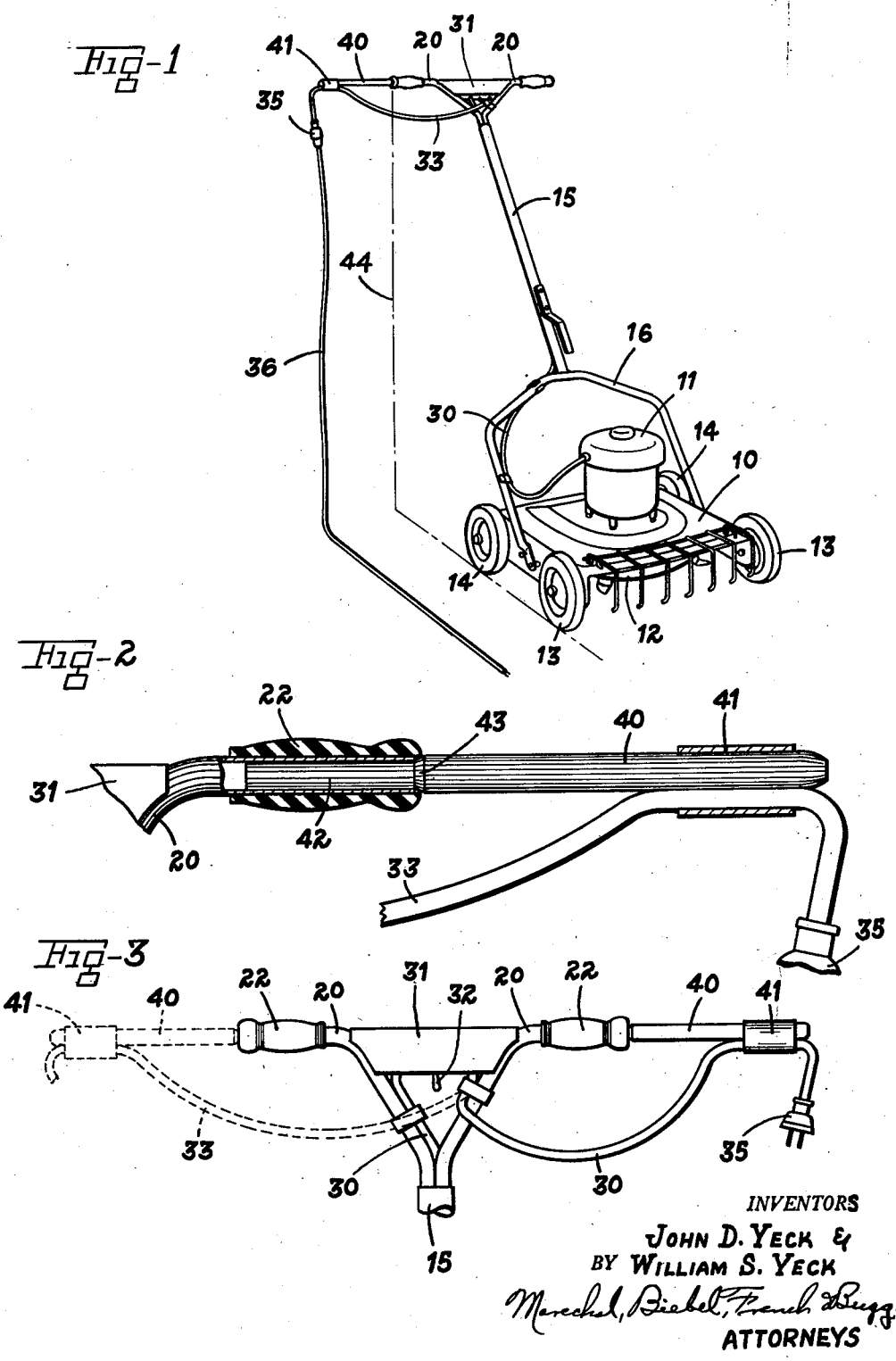

2,633,688

UNITED STATES PATENT OFFICE 2,633,688

LAWN MOWER HANDLE EXTENSION FOR ELECTRIC CORD

John D. Yeck and William S. Yeck, Dayton, Ohio, assignors to The Huffman Manufacturing Company, Dayton, Ohio, a corporation of Ohio Application February 12, 1952, Serial No. 271,231

6 Claims. (Cl. 56—25.4)

This invention relates to power lawn mowers.

More particularly the invention relates to power lawn mowers of the type having an electric motor which drives the cutting members and is provided with a length of electric cord for connection to a suitable receptacle to supply operating current for the motor. Unless adequate care is taken in operating such lawn mowers, there is considerable likelihood of accidental fouling of the electric cord with the wheels or even the cutting members of the mower, and either of these results is highly undesirable. The present invention accordingly has as its primary objective the provision of a simple attachment for supporting the cord in fixed laterally spaced relation with the mower such that it is readily maintained to one side of the path of the mower and hence out of the way of the wheels and cutters.

In accordance with the invention, a rod-like supporting or extending member is provided for attachment to the guiding handles of the mower, and the outer end of this member is secured to the electric cord in such manner as to hold and guide the cord in spaced relation with one side of the mower. In addition, in order to make convenient provision for keeping the cord out of the way both when the mower is being operated by encircling the lawn being cut and also when it is operated back and forth across the lawn, this supporting attachment is formed in accordance with the invention for quick and easy transfer from one side of the mower to the other as desired.

These and other objects and advantages of the invention will be apparent from the following description, the accompanying drawing and the appended claims.

In the drawing—

Fig. 1 is a perspective view showing an electric mower equipped with a cord extension attachment in accordance with the invention;

Fig. 2 is an enlarged fragmentary section showing the cord supporting attachment mounted in one of the handles of the lawn mower; and Fig. 3 is a diagrammatic fragmentary view showing how the cord supporting member is readily shifted from side to side of the mower handle.

Referring to the drawing, which illustrates a preferred embodiment of the invention, the lawn mower includes a main body casing 10 on which is mounted an electric motor 11 having its axis arranged vertically to support a blade disk 12 within casing 10 on the motor shaft for rotation above the ground to cut the grass as the disk rotates. The casing 10 is supported by a pair of front wheels 13 and a pair of rear wheels 14, and a handle 15 including a forked lower portion 16 is mounted on the casing for guiding the motor. At its upper end, the handle 15 is provided with a pair of forked tubular portions 20 which extend in opposite directions and are provided with hand grips 22 of rubber or the like. An electric cord 30 extends upwardly from the motor 11 to a switch mounted between the handle portions 20 in a cover 31 and shown as provided with an actuating lever 32. A further cord 33 extends from the switch and is provided with a plug 35 for attachment to a complementary receptacle on the end of an extension cord 36 adapted to be connected with a suitable receptacle in a nearby house, garage or the like forming the supply source of operating current for motor 11, and the cords 33 and 36 may be knotted together to prevent disconnection.

With the mower electrically operated as described, it will be readily apparent that the user should continually take care to maintain the wire clear of the wheels and cutters, and also that he should guide the mower in accordance with the location of the receptacle to which the extension cord is connected in order preferably to maintain sufficient slack in the cord 36 to prevent accidental disconnection thereof from its supply receptacle. However, if the cord should hang down directly from the switch, or from some other point on the handle, it may be necessary for the operator to handle the cord frequently in order to keep it free of the mower.

In order to obviate this inconvenience and at the same time to provide greatly increased protection for the cord, an extension member 40 is removably mounted on the mower handle, and the cord 33 is secured to the outer end thereof as by means of a strap or clip 41 forming a sleeve proportioned to fit over both the cord 33 and the member 40. The member 40 is shown as a rod having a portion 42 of reduced diameter adapted to be smoothly received within the open end of the handle tube portion 20, and a beveled intermediate portion 43 acts as a stop limiting penetration of the portion 42 in the handle and also provides a frictional lock to the outer end of the handle. The member 40 is proportioned with its outer portion of sufficient length to maintain the end of the cord 33 and the adjacent hanging portion of the extension cord 36 in laterally spaced relation with the vertical plane of the adjacent wheels of the lawn mower, as shown in Fig. 1 by the dotted line 44 representing this vertical plane. For example, if the portion of the member 40 outwardly of the mower handle measures from 7 to 10 inches, it will provide adequate lateral spacing of the cord without inconvenience for the operator.

In use with this extension 40 constructed as shown, the operator will usually start to cut a given strip of grass with the member 40 in whichever handle portion 20 is on the side of the mower nearest the receptacle to which the cord 36 is attached. Then if cutting back and forth across the grass, when the mower is turned at the end of each strip, the member 40 can be quickly withdrawn from the handle portion it is in and shifted to the other as indicated in dotted lines in Fig. 3. In an alternative procedure, if the receptacle is nearest to one side of the area of lawn to be cut, it is possible and convenient with the member 40 constructed as shown to cut the other three sides of the area with the member 40 on the side of the mower adjacent the uncut side of the area and without shifting this member until the mower is turned to go back along the same three sides. If the lawn mower is of the illustrated rotary type constructed for cutting operation when moving either forwards or backwards and having the handle pivoted thereon for swinging movement between positions at the front and back of the frame for guiding the mower either forwards or backwards, as shown in the copending application of Frederick Abel, Serial No. 221,991, filed April 20, 1951, and assigned to the same assignee as this application, then shifting of the extension member 40 is not necessary after initially setting the member in the handle portion 20 nearest the supply receptacle to which the cord 36 is attached. In either case, the extension member maintains the cord safely out of the way of both the wheels and the cutters of the lawn mower with minimum inconvenience for the operator and minimum effort in shifting the cord from side to side as necessary.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A power lawn mower comprising a main frame having wheels and a guiding handle provided with right and left hand handle members, cutting means supported by said frame, an electric motor on said frame for driving said cutting means, an electric cord for connecting said motor to a supply source of operating current for said motor, a rod forming a lateral extension on said handle, means for mounting said rod on one of said handle members in position to project laterally substantially beyond the side plane of said mower, and means connecting said cord to the outer end of said rod to maintain said cord in correspondingly laterally spaced relation with the side plane of said mower out of the path of said wheels and said cutting means.

2. A power lawn mower comprising a main frame having wheels and a guiding handle provided with right and left hand handle members, cutting means supported by said frame, an electric motor on said frame for driving said cutting means, a control switch for said motor carried by said mower, an electric cord connected with said switch externally of said handle members and adapted for connection to a supply source of operating current for said motor, a rod forming a lateral extension for said handle proportioned to project laterally substantially beyond the side plane of said mower, means connecting said cord to the outer end of said extension rod to maintain said cord in correspondingly laterally spaced relation with the side plane of said lawn mower out of the path of said wheels and said cutting means, and means for releasably connecting said rod selectively with one or the other of said handle members providing for shifting said rod from one handle member to the other in accordance with the path of movement of said lawn mower and the location of said current source.

3. A power lawn mower comprising a main frame having wheels and a guiding handle provided with right and left hand handle members, cutting means supported by said frame, an electric motor on said frame for driving said cutting means, an electric cord located externally of said handle members for connecting said motor to a supply source of operating current for said motor, a substantially rigid bar forming a lateral extension for said handle, means connecting said cord to the outer end of said bar to maintain said cord out of the path of said wheels and said cutting means, means for releasably connecting said bar with one of said handle members, and said bar being proportioned to project laterally substantially beyond the side plane of said mower in the mounted position thereof to maintain said core in correspondingly laterally spaced relation with said mower.

4. A power lawn mower comprising a main frame having supporting wheels, a guiding handle on said frame including right and left hand handle members of tubular material open at the ends thereof, cutting means supported by said frame, an electric motor on said frame for driving said cutting means, an electric cord connected with said motor and extending externally of said handle members for connection to a supply source for operating current for said motor, a bar forming a lateral extension for said handle, said bar including an inner end portion proportioned for releasable selective mounting within said open end in one or the other of said handle members, said bar being of a predetermined length sufficient to project laterally substantially beyond the adjacent side plane of said mower in the mounted position thereof, and means connecting said cord to the outer end of said bar to maintain said cord out of the path of said wheels and said cutting means.

5. A power lawn mower comprising a main frame having supporting wheels, a guiding handle on said frame including right and left hand handle member at the upper end thereof, cutting means supported by said frame, an electric motor on said frame for driving said cutting means, a control switch for said motor mounted on said handle, an electric cord connected with said switch and adapted for connection to a supply source for operating current for said motor, a bar forming a lateral extension for said handle, means connecting said cord to one end of said bar separately from said handle members, means for releasably connecting the other end of said bar to one of said handle members, and said bar being of a predetermined length in the mounted position thereof to project laterally substantially beyond the adjacent side plane of said mower and thereby to maintain the portion of said cord between said bar and said source out of the path of said wheels and said cutting means.

6. A power lawn mower comprising a main frame having supporting wheels at the sides thereof, cutting means supported by said frame for rotation on a vertical axis, an electric motor on said frame for driving said cutting means, a guiding handle on said frame including laterally extending right and left hand handle members, at least one of said handle members having a recess in the outer end thereof, a control switch for said motor mounted on said handle, an electric cord for connecting said switch to a supply source of operating current for said motor, a rod adapted to form a lateral extension for said handle, said bar including an inner end portion constructed for insertion in said recess in said handle member to support said rod in laterally extending relation with said handle member, said rod being of a predetermined length sufficient to project laterally substantially beyond the vertical plane of the adjacent said wheels in the mounted position thereof, and means forming a sleeve adapted to enclose said cord and the outer end portion of said rod to maintain the portion of said cord between said rod and said source out of the path of said wheels and said cutting means.

JOHN D. YECK.
WILLIAM S. YECK.

REFERENCES CITED

The following references are of record in the file of this patent:

UNITED STATES PATENTS

| Number | Name | Date |
| --- | --- | --- |
| Re. 18,944 | Beazley | Sept. 12, 1933 |
| 2,167,222 | Shelor | July 25, 1939 |
| 2,480,944 | Malpass | Sept. 6, 1949 |
| 2,487,927 | Isaacs | Nov. 15, 1949 |